(12) United States Patent
Kuplevakhsky

(10) Patent No.: US 10,630,933 B2
(45) Date of Patent: *Apr. 21, 2020

(54) DISPLAY DEVICE VIEWING ANGLE COMPENSATION

(71) Applicant: DISH Ukraine L.L.C., Kharkov (UA)

(72) Inventor: Andrey Kuplevakhsky, Kharkov (UA)

(73) Assignee: DISH Ukraine L.L.C., Kharkov (UA)

( * ) Notice: Subject to any disclaimer, the term of this patent is extended or adjusted under 35 U.S.C. 154(b) by 0 days.

This patent is subject to a terminal disclaimer.

(21) Appl. No.: 16/452,104

(22) Filed: Jun. 25, 2019

(65) Prior Publication Data

US 2019/0320133 A1 Oct. 17, 2019

Related U.S. Application Data

(63) Continuation of application No. 15/524,161, filed as application No. PCT/UA2014/000117 on Oct. 24, 2014, now Pat. No. 10,375,344.

(51) Int. Cl.
*H04N 5/272* (2006.01)
*H04N 5/58* (2006.01)
*H04N 21/422* (2011.01)
*H04N 21/431* (2011.01)
*H04N 21/442* (2011.01)
(Continued)

(52) U.S. Cl.
CPC ............... *H04N 5/58* (2013.01); *G06F 3/013* (2013.01); *G09G 3/20* (2013.01); *G09G 5/00* (2013.01); *H04N 9/643* (2013.01); *H04N 21/42202* (2013.01); *H04N 21/4318* (2013.01); *H04N 21/44218* (2013.01); *H04N 21/4755* (2013.01); *G09G 2320/028* (2013.01); *G09G 2320/06* (2013.01); *G09G 2320/066* (2013.01);

*G09G 2320/068* (2013.01); *G09G 2320/0666* (2013.01); *G09G 2320/0686* (2013.01);
(Continued)

(58) Field of Classification Search
CPC .................................................. H04N 13/0422
USPC ........................................................... 348/54
See application file for complete search history.

(56) References Cited

U.S. PATENT DOCUMENTS 10,375,344 B2 * 8/2019 Kuplevakhsky ......... G09G 3/20
10,452,135 B2 * 10/2019 Files .................. H04N 5/23293
(Continued)

FOREIGN PATENT DOCUMENTS

EP          2141921 A1     1/2010
WO       2016-064366 A1    4/2016

OTHER PUBLICATIONS

U.S. Appl. No. 15/524,161, "Final Office Action", dated May 24, 2018, 17 pages.
(Continued)

*Primary Examiner* — Jefferey F Harold
*Assistant Examiner* — Sihar A Karwan
(74) *Attorney, Agent, or Firm* — Kilpatrick Townsend & Stockton LLP

(57) ABSTRACT

Various embodiments for compensating for user view angle of a display device are presented. The viewing angle of a user may be determined using sensors. Based on the viewing angle, the attenuation of the output of the display device may be determined. Compensation mode for the display output may be determined. The compensation mode may adjust the output of the display to compensate for the display attenuation allowing an improved image quality at large viewing angles.

20 Claims, 7 Drawing Sheets

(51) Int. Cl.
  *H04N 21/475*  (2011.01)
  *G09G 3/20*    (2006.01)
  *G09G 5/00*    (2006.01)
  *G06F 3/01*    (2006.01)
  *H04N 9/64*    (2006.01)
(52) U.S. Cl.
  CPC ..... *G09G 2320/08* (2013.01); *G09G 2354/00* (2013.01); *G09G 2360/144* (2013.01)

(56) References Cited

U.S. PATENT DOCUMENTS

| | | | | |
|---|---|---|---|---|
| 2008/0316372 | A1* | 12/2008 | Xu | G09G 3/20 348/739 |
| 2013/0044124 | A1* | 2/2013 | Reichert, Jr. | H04N 5/272 345/618 |
| 2013/0307948 | A1 | 11/2013 | Odake et al. | |
| 2014/0092142 | A1* | 4/2014 | Boelter | G09G 5/00 345/672 |
| 2014/0146069 | A1* | 5/2014 | Tan | G06F 3/011 345/589 |
| 2014/0362159 | A1* | 12/2014 | Zhai | H04N 19/117 348/14.01 |
| 2015/0145883 | A1* | 5/2015 | Marti | G09G 3/20 345/592 |
| 2015/0187258 | A1* | 7/2015 | Lee | G06K 9/00604 345/207 |
| 2017/0264851 | A1* | 9/2017 | Kuplevakhsky | G09G 3/20 |

OTHER PUBLICATIONS

U.S. Appl. No. 15/524,161, "Non-Final Office Action", dated Oct. 17, 2018, 13 pages.
U.S. Appl. No. 15/524,161, "Non-Final Office Action", dated Oct. 31, 2017, 14 pages.
U.S. Appl. No. 15/524,161, "Notice of Allowance", dated Mar. 26, 2019, 6 pages.
International Search Report and Written Opinion of PCT/UA2014/000117, dated Apr. 16, 2015, all pages.
International Preliminary Report on Patentability for PCT/UA2014/000117 dated Apr. 25, 2017, all pages.

* cited by examiner

DISPLAY DEVICE VIEWING ANGLE COMPENSATION

CROSS-REFERENCES TO RELATED APPLICATIONS

This application is a continuation of U.S. patent application Ser. No. 15/524,161, filed on May 3, 2017, entitled "Display Device Viewing Angle Compensation,", which is a U.S. National Stage of International Application No. PCT/UA2014/000117, filed on Oct. 24, 2014, entitled "Display Device Viewing Angle Compensation," the disclosures of which are hereby incorporated by reference in their entirety for all purposes.

BACKGROUND OF THE INVENTION

Display devices such as televisions or monitors often have a preferred viewing angle. When viewed from the preferred angle the display devices have good contrast, color and/or brightness. When the display is viewed from an angle greater than the preferred angle, the display characteristics may be degraded. In many cases the preferred viewing angle may be too narrow for many applications. In many homes, for example, a television may be viewed from many different angles as a user moves around the home. In many cases, users are forced to view the display device outside of the viewing angle with degraded display characteristics.

BRIEF SUMMARY OF THE INVENTION

In various aspects, provided are systems, methods and devices, such as television receivers, for correcting images displayed by a display device, such as a television. In a related aspect, computer-program products are provided, such as a product tangibly embodied on a non-transitory machine-readable medium with instructions configured to cause a computing device or processor to perform any of the methods described herein. The systems, methods, devices and products described herein optionally utilize one or more techniques for changing the output of a display device to compensate for a change in the contrast, color or brightness of images displayed by the display device when viewed from a non-preferred viewing angle, such as from a viewing angle where the displayed image offers non-acceptable visual performance. Sensors are optionally used to determine a viewing location of a user in real-time and adjustments to image settings and/or display device settings are made in real-time.

In one embodiment, the systems, methods, devices and products described herein control the display device to adjust the brightness, contrast, color, saturation, luma, hue, tint, shade, etc., of the display device to compensate for the viewing angle of a user, such that the user is presented with an at least partially corrected image from the display device. Optionally, the brightness, contrast, color, saturation, luma, hue, tint, shade, etc., of the entire display device are adjusted. Optionally, the brightness, contrast, color, saturation, luma, hue, tint, shade, etc., of only a portion of the display device is adjusted. Optionally, the brightness, contrast, color, saturation, luma, hue, tint, shade, etc., of different portions of the display device are adjusted independently.

In another embodiment, the systems, methods, devices and products described herein adjust the brightness, contrast, color, saturation, luma, hue, tint, shade, etc., of an image before it is sent to the display device in order to compensate for the viewing angle of a user, such that the user is presented with an at least partially corrected image from the display device. Optionally, the brightness, contrast, color, saturation, luma, hue, tint, shade, etc., of the entire image is adjusted. Optionally, the brightness, contrast, color, saturation, luma, hue, tint, shade, etc., of only a portion of an image is adjusted. Optionally, the brightness, contrast, color, hue, tint, shade, etc., of different portions of an image are adjusted independently.

Optionally, both the display device and the image are adjusted. For example, one or more of the brightness, contrast, color, saturation, luma, hue, tint, shade, etc., of the display device, or a portion thereof, and one or more of the brightness, contrast, color, saturation, luma, hue, tint, shade, etc., of an image, or a portion thereof, are adjusted independently.

In one aspect, provided are methods for correction of images displayed by a display device. In a specific embodiment, a method of this aspect comprises monitoring a position of a first user; determining a first viewing angle between the display device and the first user, for example by using the position of the first user and a position of the display device; determining a first image display setting change to compensate for attenuation of output of the display device when viewed from the first viewing angle; and adjusting image display settings in real-time to compensate for the attenuation of output of the display device. In an exemplary embodiment, a method of this aspect further comprises monitoring a position of a second user; determining a second viewing angle between the display device and the second user, for example by using the position of second user and the position of the display device; and determining a second image display setting change to compensate for attenuation of output of the display device when viewed from the second viewing angle.

In some situations, multiple users may be positioned at locations for which both users experience non-optimal viewing conditions. In various embodiments, methods of this aspect allow compromises to be made to adjust the image/display to provide the multiple users with displayed images that, although are not as optimal as they might be for each user, are still optimized at least partially for both users. For example, a method of this aspect optionally further comprises determining that a difference between the first viewing angle and the second viewing angle is less than a threshold angle; and determining a third image display setting change to compensate for attenuation of output of the display device due to a third viewing angle between the first viewing angle and the second viewing angle. Optionally, the step of adjusting the image display settings in real-time to compensate for the attenuation of output of the display device includes adjusting the image display settings in real-time to compensate for the attenuation of output of the display device when viewed from the third viewing angle. In various embodiments, the threshold angle is 5 degrees, 10 degrees, 15 degrees, 20 degrees, 25 degrees, 30 degrees, 40 degrees or 45 degrees.

In various embodiments, it is desirable to determine whether one or more users is actively viewing the display. If only a single user is viewing the display, though other users may be present, methods of this aspect include the ability to optimize the images displayed on a display for the single user. For example, methods of this aspect optionally further comprise tracking activity of the first user and the second user; determining that the activity of the first user is not consistent with the first user watching the display device; and determining that the activity of the second user is consistent with the second user watching the display device; wherein adjusting the image display settings in real-time to compensate for the attenuation of output of the display device includes adjusting the image display settings in real-time to compensate for the attenuation of output of the display device when viewed from the second viewing angle. For example, in embodiments, tracking activity includes monitoring motion of the first user and/or the second user. Optionally, tracking activity includes monitoring eye movement of the first user and/or the second user.

Optionally, adjustments to the image and/or display settings are made in real time, such as to account for changes to viewing angles as they happen or within a short time period, for example 5 seconds or less, 3 seconds or less, 1 second or less or 0.5 seconds or less. In one embodiment, the step of adjusting image display settings in real-time to compensate for the attenuation of output of the display device includes adjusting display settings of the display device in real-time including one or more of a brightness setting of the display device, a color setting of the display device and a contrast setting of the display device. In another embodiment, the step of adjusting image display settings in real-time to compensate for the attenuation of output of the display device includes adjusting color, brightness and/or contrast settings of images provided to the display device in real-time.

In another aspect, provided are television receivers and display devices for correction of images displayed by a display device. In an exemplary embodiment, a television receiver or display device of this aspect comprises one or more processors and a memory communicatively coupled with and readable by the one or more processors and having stored therein processor-readable instructions. In embodiments, the processor-readable instructions, when executed by the one or more processors, cause the one or more processors to: monitor a position of a first user; determine a first viewing angle between the display device and the first user; determine a first image display setting change to compensate for attenuation of output of the display device when viewed from the first viewing angle; and adjust image display settings in real-time to compensate for the attenuation of output of the display device. Optionally, the processor-readable instructions cause the one or more processors to perform any of the methods described herein.

As will be understood by the skilled artisan, a television receiver or display device of this aspect optionally includes additional components to allow the television receiver or display device to receive, decode, demodulate, demultiplex, decompress and/or process signals in order to generate and/or display viewable images. For example, a television receiver or display device of this aspect optionally includes a radio frequency receiver for receiving analog or digital transmissions. A display device optionally includes a display panel and associated circuitry for displaying images, including moving images. Useful display devices include, but are not limited to, liquid crystal displays, light emitting diode displays, organic light emitting diode displays, plasma displays, cathode ray tube displays, projection displays, television sets, computer monitors and the like.

In some embodiments, a television receiver or display device of this aspect further comprises one or more sensors, such as one or more sensors for observing an environment proximate to the display device. In exemplary embodiments, the one or more sensors are communicatively coupled with the one or more processors, such as over a wired or wireless connection. Optionally, the one or more processors receive signals from one or more sensors corresponding to an observation of the environment proximate to the display device. Useful sensors include, but are not limited to, cameras, heat sensors, ambient light sensors, depth sensors, motion sensors, arrays of sensors, digital imaging cameras, range finding sensors, passive infrared detection sensors, acoustic distance detection sensors, acoustic cameras, 3D imagers and the like.

In another embodiment, provided are non-transitory processor-readable media for correction of images displayed by a display device. In embodiments, a non-transitory processor-readable medium of this aspect comprises processor-readable instructions configured to cause the one or more processors to: monitor a position of a first user; determine a first viewing angle between the display device and the first user; determine a first image display setting change to compensate for attenuation of output of the display device when viewed from the first viewing angle; and adjust image display settings in real-time to compensate for the attenuation of output of the display device.

In embodiments, a non-transitory processor-readable medium of this aspect comprises processor-readable instructions configured to cause one or more processors to perform any of the methods described herein. For example, in one embodiment, the processor-readable instructions that cause the one or more processors to adjust the image display settings in real-time to compensate for the attenuation of output of the display device cause the one or more processors to adjust display settings of the display device in real-time including one or more of a brightness setting of the display device, a color setting of the display device and a contrast setting of the display device. In one embodiment, for example, the processor-readable instructions that cause the one or more processors to adjust the image display settings in real-time to compensate for the attenuation of output of the display device cause the one or more processors to adjust color, brightness and/or contrast settings of images provided to the display device in real-time.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one or more of the similar components having the same first reference label irrespective of the second reference label.

DETAILED DESCRIPTION OF THE INVENTION

The preferred viewing angle of display devices such as televisions or monitors may be too narrow for many applications. In a home environment, for example, users may view the television as they move around the home. In some arrangements, a user may be within the preferred viewing angle when sitting on the couch of a home but may be outside of the preferred viewing angle when viewing from the kitchen. When the user is viewing the display device outside of the preferred viewing angle, the quality of the picture and display characteristics may be degraded compared to when the display device is viewed from within the preferred viewing angle. Outside of the preferred viewing angle, the brightness, colors, contrast, etc., of the display may be degraded. For example, in some display devices the brightness of the display may decrease with the viewing angle, giving the display images a darker appearance with an increased viewing angle. Some other display devices may attenuate one or more colors. For example, in many displays, blue colors may be attenuated with an increased viewing angle resulting in colors that are at least partially inverted.

Figure 1:
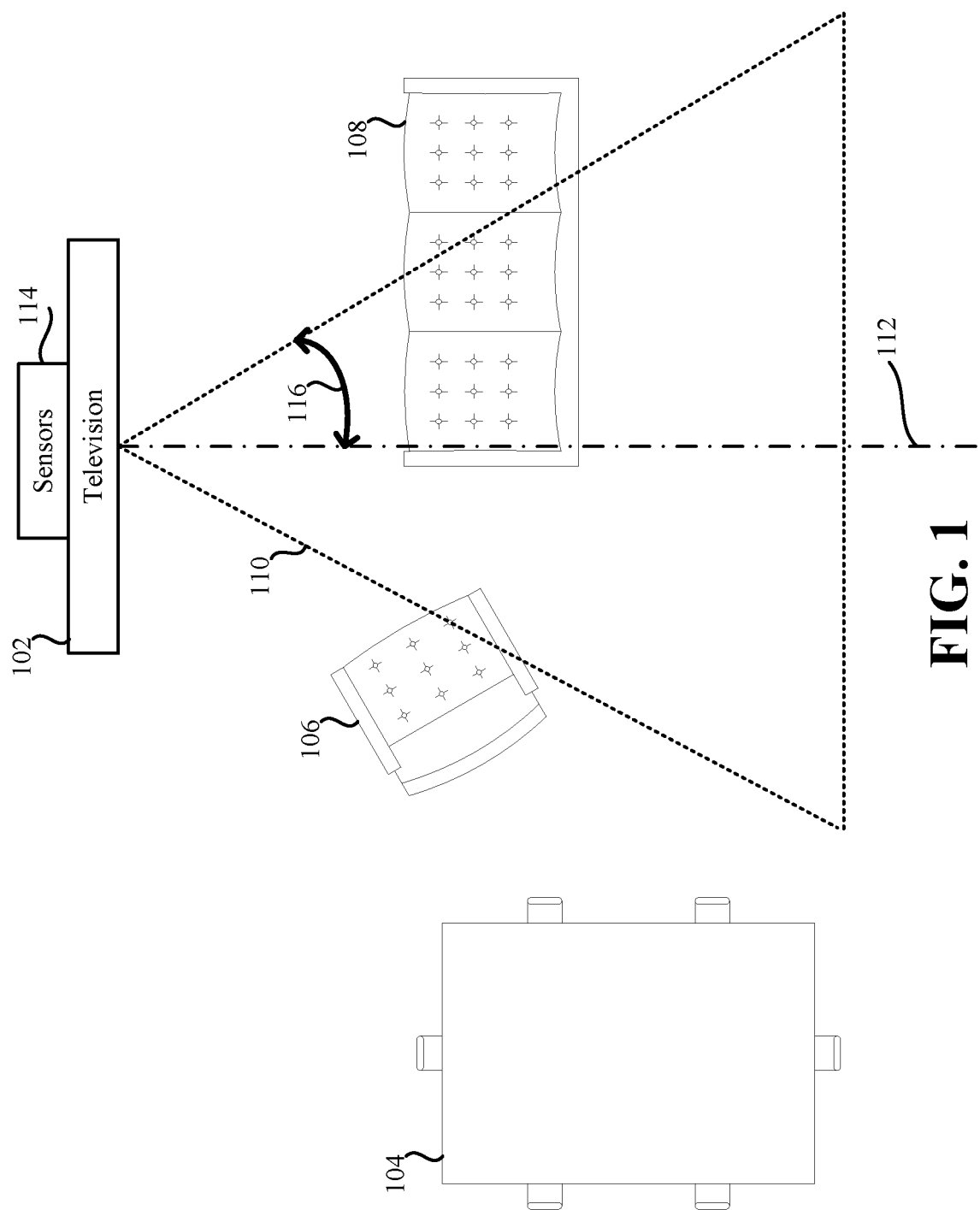
FIG. 1 depicts a home environment with a display device.

FIG. 1 depicts a home environment with a display device 102. The figure depicts the layout of an area of a room from an overhead perspective. The display device 102, such as a television, may be centrally located in the room. The viewing angle 116 of the display device 102 may be the angle with respect to the normal or perpendicular axis 112 to the screen of the display device 102. The viewing angle may define an area or a viewing cone 110. The viewing cone may represent the preferred viewing angles for which the television 102 provides the best display. Users viewing the display device 102 within the viewing cone 110 would normally not experience any display degradation. Users viewing the display device 102 outside the cone (i.e., from the chair 106 or the dining area 104) may experience picture degradation due to attenuation of brightness, colors, contrast and the like.

In embodiments, one or more sensors 114 may be used to determine the location of a user. For example, one or more sensors 114 may observe the environment proximate to the display. Sensors 114 may determine the location of the user relative to the sensors 114 and/or the display device 102. Sensor readings may be used to determine the viewing angle of the user for the display device 102. Based on the viewing angle of the user, the type of display device, display model, ambient conditions, display picture or the like, the magnitude and type of distortions and attenuations to the display images may be determined. Using the magnitude of the distortions and attenuations, the display characteristics of the television may be adjusted to compensate for the display distortion and attenuation.

In embodiments, the display device output may be adjusted to compensate for the attenuation or distortion. Optionally, display output parameters, like the brightness, colors, saturation, contrast and the like may, be adjusted on the display device. The display output parameters may be adjusted to provide a display image on the display device closer to the true or accurate display image. For example, for one particular television, the brightness of the screen may decrease with increased viewing angle. Based on the detected viewing angle of the user, the brightness of the television screen may be increased to compensate for the attenuation.

In embodiments, the output of the display may be adjusted by changing the output setting of the display device. Settings such as brightness, contrast, colors and the like may be adjusted by changing settings on the display device. For example, brightness may be adjusted by increasing the intensity of the backlight of the display device. In some embodiments, the output of the display may be adjusted by processing of the images to be displayed on the display device. Images, video and the like may be processed and altered before being displayed on the display device. For some situations, portions of an image may be processed and/or altered before being displayed on a display. The images may be altered to change colors, saturation, brightness and the like of the images, or portions thereof, to compensate for distortions and attenuation when they are viewed at a viewing angle greater than the preferred viewing angle of the display.

In embodiments, sensors 114 may include one or more cameras, heat sensors, ambient light sensors, depth sensors, motion sensors and the like. The sensors may be used to track the location of a user in a room. An array of motion sensors, for example, is useful for detecting motion of a user. In another example, a digital imaging camera may be used to image the areas around the television. The captured images may be analyzed to identify the position of the user.

In some embodiments, sensors may include sensors such as ambient light sensors, which may be configured to determine the brightness of the location of the display device or used to determine if the display device and/or surrounding environment is exposed to direct sunlight. Settings of the display device and/or images, or portions thereof, are optionally modified to compensate for ambient lighting conditions.

In some implementations, range finding sensors, such as passive infrared or acoustic distance detection systems may be used to determine a location or motion of a user. For example, three dimensional infrared image based scanning techniques may be employed to track a user's location and/or motion. For example, in some embodiments, the sensors include an acoustic camera or 3D imager. Monitoring a location or motion of a user in real-time advantageously provides systems and methods described herein with the ability to dynamically alter a display's output, in real-time, in response to a user while the user moves, such that, for example, an optimal or at least partially improved image can be presented to the user on the display.

Figure 2:
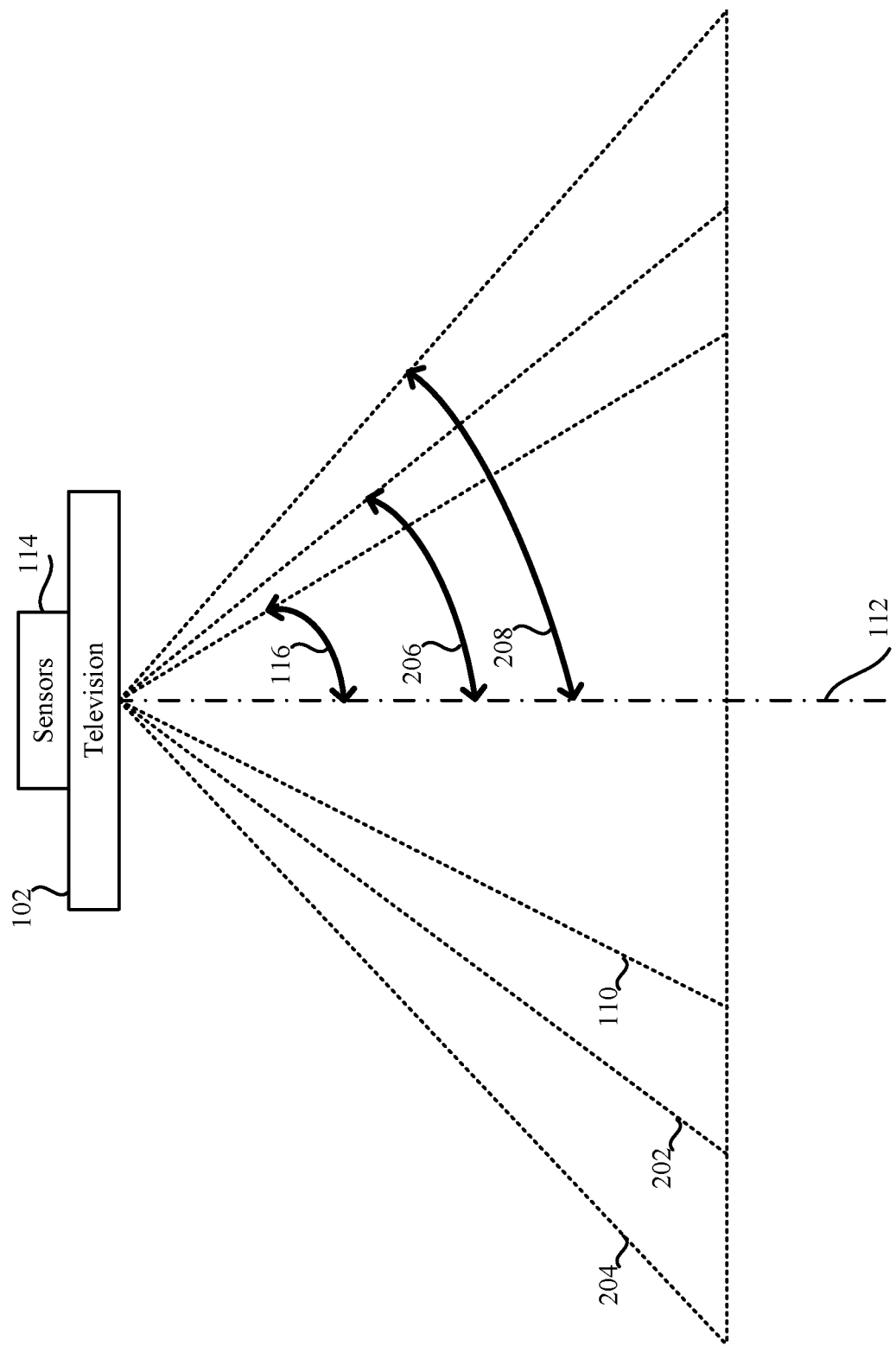
FIG. 2 shows an example configuration with four zones.

In embodiments, the viewing angle compensation may be infinitely variable based on the viewing angle of the user. The viewing angle compensation, in some embodiments, the viewing angle compensation may be limited to several levels or zones. A level or zone may specify a range of viewing angles. For example, FIG. 2 shows an example configuration with four zones. The system in the figure has the normal preferred viewing cone 110 defined by the angle 116. For the preferred zone no compensation is typically needed. For viewing angles less than or equal to the angle 206 but greater than angle 116, another zone 202 may be defined. When a user is detected to be at a viewing angle within the second zone, the display device may operate in a first compensation mode. Likewise, additional zone 204 defined between angles 208 and 206 may be defined for use of a second compensation mode. A final zone, for viewing angles larger than angle 208, may be defined and may use a third compensation mode. Viewing angle compensation may be divided into two or more or even 200 or more zones.

In embodiments, the selection between compensation modes or settings may be manually selected by a user instead or in compliment to automatic detection using sensors. A user may manually select a compensation mode by selecting a setting using a remote control or other user interface. The user may, by pressing one or more buttons on a remote for example, cycle through two or more compensation modes for the display device until a satisfactory mode for the viewing angle of the user is found.

In embodiments, compensation modes or settings may be specific to each display type, model, manufacturer and the like. In some cases compensation modes may be predefined by a manufacturer, service provider or downloaded from a network. In some embodiments, the compensation modes may be defined by a user. A user may adjust the output parameters of a display and configure the options to be selected when the user is at a specific viewing angle or viewing location or within a specified range of viewing angles.

In some environments more than one user may be within viewing distance and angle of a display device. In a multi-user environment different users may be at different viewing angles to the display device. The viewing angles may require different compensation modes. In some cases, despite having multiple users near a display device, only one user may be actively watching the content on the display. Other users around the display device, for example, may be engaged in other tasks or only listening to audio output of the display device and not actively watching or directly looking at the display device. A user that is actively watching the display device may provide an indication that the user is the active user and the compensation mode should be adjusted to the viewing angle of the active user. The indication by the user may be provided by entering remote control commands. The indication by the active user may be provided with a gesture that may be recognized by the sensors. A gesture such as a wave or a particular hand movement may be used to signal to the sensors the location of the active user.

In some embodiments sensors may determine the location of the active user. Sensors may monitor the gestures, eye movement, body position and the like of the users to identity the active user. For example, camera sensors may monitor the eye position and/or movement of the users. Optionally, a location of a user's gaze is determined. For example, based on the eye position or gaze location, it may be determined which users are actively watching the content on the display. A non-viewing user is optionally ignored, such as someone walking through a room including the display.

In the case when more than one user is actively watching the display device and each user is positioned at a viewing angle that may require a different compensation mode, a compromise between the compensation modes may be made. An average of the compensation modes applicable for the different users may be taken and used for the display device. In some cases other functions may be used with different weighting of the different compensation modes. In some cases if the differences in the compensation modes required for the two users are less than a threshold, a smaller of two compensation modes may be selected for both users allowing at least one user to have the optimal picture characteristics.

In embodiments, one or more aspects of the selection of a compensation mode, detection of users and other methods related to adjusting display settings for a viewing angle may be performed on the display device. A display device optionally includes one or more sensors. Sensor readings may be analyzed using one or more processors of the display device or an associated device, such as a television receiver.

For example, processing of sensor readings, determination of compensation modes and other tasks may be performed by an external device such as a television receiver or a set-top-box (STB). A STB that is communicatively coupled to a display device may monitor sensor readings and may determine a compensation mode for the display. The STB may adjust the settings of the display device to achieve settings of the compensation mode. The settings of the display device may be adjusted by the STB using a communication port or other adjustment interface for the display device. In some cases the compensation mode for the display may include processing or adjusting the characteristics of the images transmitted to the display device.

Figure 3:
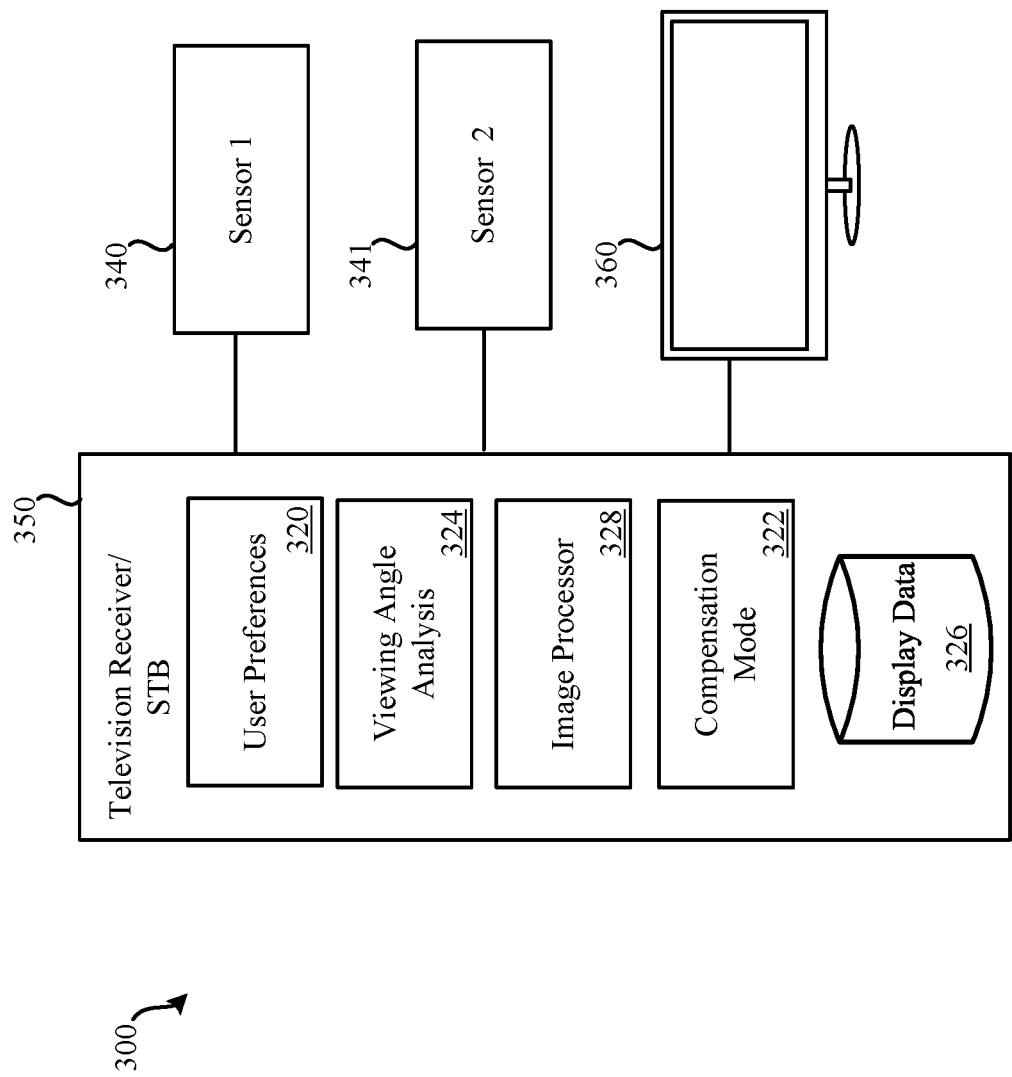
FIG. 3 shows an embodiment of a system for viewing angle compensation in a home.

FIG. 3 shows an embodiment of a system for viewing angle compensation in a home that includes a receiver 350, such as a television receiver or STB. The system 300 may include a receiver 350 that is directly or indirectly coupled to one or more display devices 360 such as a television, monitor, liquid crystal display (LCD) or plasma display. The receiver 350 may be configured to receive readings from one or more sensors 340, 341. Sensors 340, 341 may be wired to the receiver 350. For example, sensors 340, 340 may be positioned in data communication with one or more processors of the receiver 350. In some cases, sensors 340, 341 may connect wirelessly to the receiver 350 via one or more wireless protocols and technologies, such as WiFi, CAN bus, Bluetooth, I2C bus, ZigBee, Z-Wave, wireless USB and/or the like. In some cases, the sensors 340, 341 may be part of other devices, consoles or home equipment. In various embodiments, the sensors 340, 341 provide observations of an environment proximate to the display device 360.

In embodiments, the receiver 350 optionally includes a viewing angle analysis module 324. The viewing angle analysis module 324 optionally controls and receives readings from sensors 340, 341. The viewing angle analysis module 324 optionally includes or utilizes protocols for communicating and interpreting data from the sensors. The viewing angle analysis module 324 optionally controls the timing of when the sensors are active. The viewing angle analysis module 324 optionally interprets sensor readings to determine the viewing angle of one or more users. With multiple users, the viewing angle analysis module 324 may analyze sensor readings to determine which users are actively watching the display device. In one example, sensors 340, 341 may include an array of motion sensors. Each motion sensor may be positioned in a slightly different direction. The viewing angle analysis module 324 may monitor readings from the different motion sensors and, based on which motion sensors detect motion of a user, viewing angle analysis module 324 may determine the viewing angle of the user. In another example, sensors 340, 341 optionally include cameras, such as for taking images around the display device. The images are optionally analyzed by the viewing angle analysis module 324 to identify eyes of users near the display device. The activity, position and direction of the eyes are optionally used to identify users that are actively watching the display.

The receiver 350 optionally includes a compensation mode module 322. The compensation mode module 322 optionally receives viewing angle data from the viewing angle analysis module 324. Based on the viewing angle of the one or more users, the compensation mode module 322 can advantageously determine a compensation mode for the display device 360. The compensation mode may include adjustments to the output characteristics of the display device 360. The compensation mode module 322 may access one or more databases 326 that include display data, such as information about various displays, manufacturers, optimal viewing angles, etc. Database 326 advantageously includes data for the output characteristics of the display device 360. The database characteristics may include data related to the attenuation of output at various angles for the display device 360 or the type of display. Based on the data from the database 326, the compensation mode module 322 may determine adjustments to the output of the display device 360 to compensate for the attenuations. The receiver 350 optionally transmits commands to the display device to change the output characteristics of the display device.

In some embodiments, however, the compensation mode module 322 may determine adjustments to the images transmitted to the display device 360. Images transmitted from the receiver 350 to the display device 360 may be modified before being sent to the display device to compensate for attenuations at different viewing angles. The compensation mode module 322 may determine which colors to enhance in the images or may determine optimal brightness or contrast settings for the images. Filters may be applied to the images using an image processor 328 module optionally included in receiver 350. The image processor 328 module may filter or apply transformations, such as color adjustments, color swapping, brightness changes, contrast adjustments and the like, to compensate for attenuations.

The compensation mode module 322, when determining a compensation mode, may receive data from user preferences 320. The user preferences may override compensation mode settings for one or more viewing angles.

Various techniques may be used to detect or improve the detection of a user, such as by using the sensors to determine the viewing angle of the user. In one example, the sensors, such as cameras may collect baseline or background sensor readings. Background or baseline sensor readings may be captured over time during different times of the day or week. New captured sensor readings may be compared against background sensor readings to identify changes in the readings. In one example, a difference between the background sensor readings and a new captured sensor reading may be determined. Differences in the sensor readings may reveal the position of a user.

During operation of the system 300, readings from the sensors 340, 341 may be collected and stored in the receiver 350. In embodiments, a historical record of sensor readings and user location and viewing angle may be used to enhance user location detection. Ambiguities in sensor readings or sensor readings that indicate that the user may be in one of two locations, for example, may be supplemented with the historical data. Historical data may indicate that, during a specific time period, for example, a user is typically in a first location and has never been detected in the second location during the specific time period. The system 300 may use the historical position and data and configure the compensation mode consistent with the historical location of the user.

In embodiments the television receiver may be configured to provide the automatically generated or determined compensation mode settings to a user, such as by way of a user interface. An interface may allow the user to modify one or more settings of the compensation modes. Display devices such as television, laptops, tablets, smartphones and the like may be used for presenting to the user the interfaces for modifying the compensation mode settings. An interface may include one or more options, selection tools, navigation tools, etc., for modifying and viewing the compensation mode settings.

Display interfaces may be used to select and/or download display data for displays. In some cases, the model or type of the display device may not be automatically determined and may need to be manually specified by a user. A user may input, using the interface, the model or type of the display. In some cases, display data may not be available and the user may select a generic display data as a baseline from which compensation modes may be established. The user may then edit the compensation modes to match the display characteristics. User modifications of compensation modes may be transmitted to a service provider. The service provider may use user modifications to update or change algorithms for determining the compensation modes.

Figure 4:
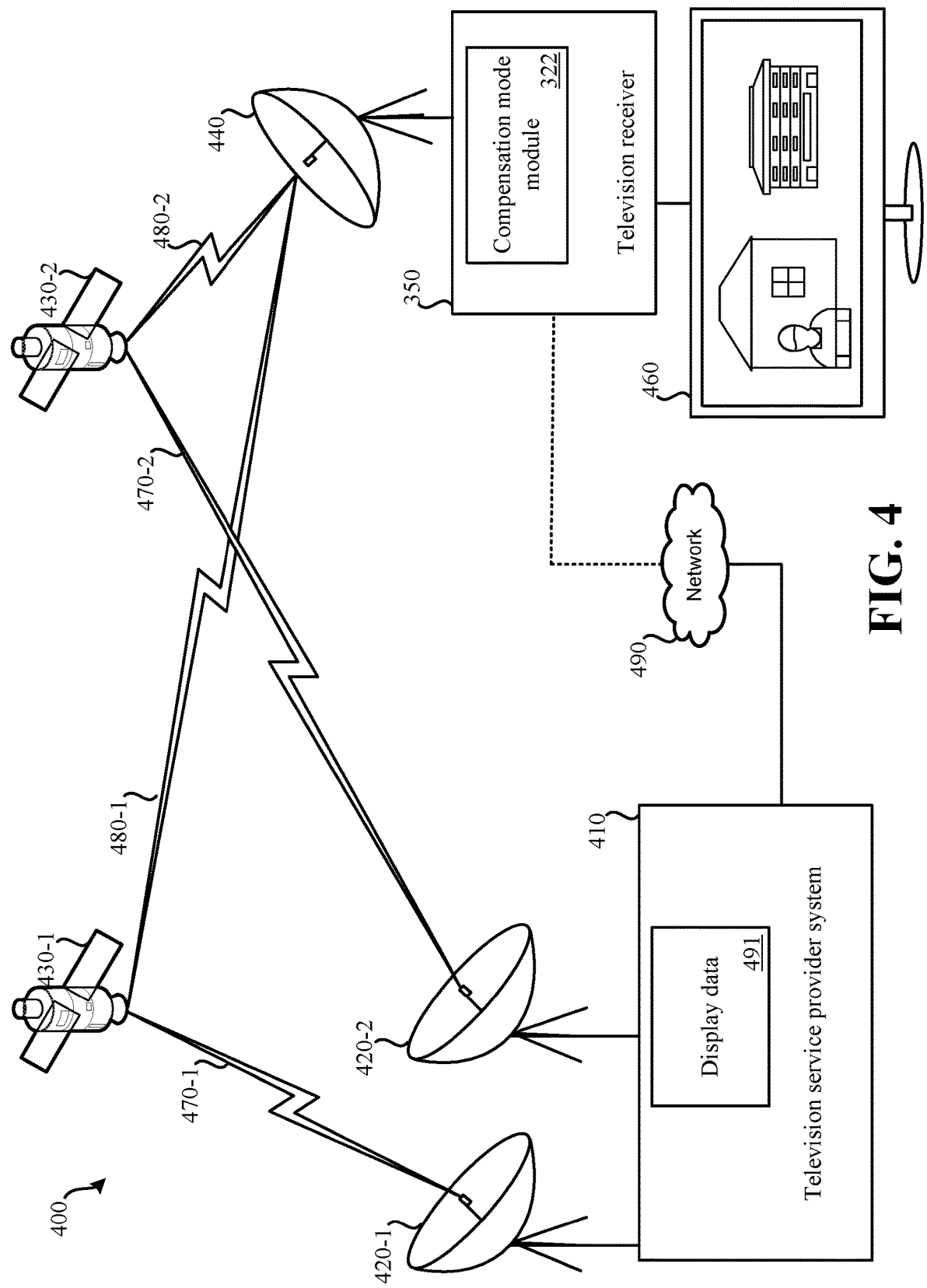
FIG. 4 illustrates an embodiment of a satellite television distribution system.

Viewing angle compensation may be performed in television receivers or STBs for a satellite-based television system. Viewing angle compensation may also be performed in television receivers designated for other television systems, such as cable, IPTV, terrestrial or hybrid systems. An embodiment of a satellite-based television system is illustrated in FIG. 4. As illustrated, satellite television distribution system 400 includes: television service provider system 410, satellite transmitter equipment 420, satellites 430, satellite dish 440, receiver 350 and display device 460, such as a television. Alternate embodiments of satellite television distribution system 400 may include fewer or greater numbers of components. While only one satellite dish 440, receiver 350 and display device 460 (collectively referred to as "user equipment") are illustrated, it should be understood that multiple (e.g., tens, thousands, millions) instances of user equipment may receive television signals from television service provider system 410 via satellites 430.

Television service provider system 410 and satellite transmitter equipment 420 may be operated by a television service provider. A television service provider may distribute television channels, on-demand programming, programming information, marketing content and/or other content/services to users. In some embodiments the television service provider 410 may distribute or provide a gateway or library of display data related to output degradation at various viewing angles.

To distribute television channels for presentation to users, feeds of the television channels may be relayed to user equipment, for example via multiple television distribution satellites. Each satellite may relay multiple transponder streams. Satellite transmitter equipment 420 (420-1, 420-2) may be used to transmit a feed of one or more television channels from television service provider system 410 to one or more satellites 430. While a single television service provider system 410 and satellite transmitter equipment 420 are illustrated as part of satellite television distribution system 400, it should be understood that multiple instances of transmitter equipment may be used, such as scattered geographically, to communicate with satellites 430. Such multiple instances of satellite transmitting equipment may communicate with the same or with different satellites. Different television channels may be transmitted to satellites 430 from different instances of transmitting equipment. For instance, a different satellite dish of satellite transmitter equipment 420 may be used for communication with satellites in different orbital slots.

Satellites 430 may be configured to receive signals, such as streams of television channels, from one or more satellite uplinks such as satellite transmitter equipment 420. Satellites 430 may relay received signals from satellite transmitter equipment 420 (and/or other satellite transmitter equipment) to multiple instances of user equipment via transponder streams. Different frequencies may be used for uplink signals 470 from transponder streams 480.

Satellite dish 440 may be a piece of user equipment that is used to receive transponder streams from one or more satellites, such as satellites 430. Satellite dish 440 may be provided to a subscriber for use on a subscription basis to receive television channels provided by the television service provider system 410, satellite transmitter equipment 420 and/or satellites 430.

In communication with satellite dish 440 may be one or more receivers 350. Television receivers may be configured to decode signals received from satellites 430 via satellite dish 440 for output and presentation via the display device 460, such as a television, a plasma panel or a liquid crystal display panel or projector. A receiver 350 may be incorporated as part of a television or may be part of a separate device, commonly referred to as a set-top box.

Display device 460 may be used to present video and/or audio decoded and output by receiver 350. Receiver 350 may also output a display of one or more interfaces to display device 460, such as an electronic programming guide (EPG). The receiver 350 may output to a display device 460 one or more interfaces for modifying the compensation modes. In many embodiments, display device 460 is a television. Display device 460 may also be a monitor, computer, projector or some other device configured to display video and, optionally, play audio.

The receiver 350, may determine the compensation mode for the display settings using a compensation mode module 322. The receiver 350 may adjust the output settings of the display device 460 according to the compensation mode. The receiver 350 optionally transmits commands to the display device to adjust the colors, brightness and other settings.

In some embodiments, after decoding of the programming and television channels received from the satellites, the content may be modified before the content is presented on the display device. Content may be filtered or processed to adjust the colors of the images to be presented on the display device. The images may be filtered or processed according to the compensation mode for the viewing angle of the user.

Network 490 may serve as a secondary communication channel between television service provider system 410 and receiver 350. Via such a secondary communication channel, bidirectional exchange of data may occur. Data may be transmitted to television service provider system 410 from receiver 350 via network 490. Data may also be transmitted from television service provider system 410 to receiver 350 via network 490. Network 490 may include portions of the Internet. The network 490 may be used to transfer display data to the receiver 350. The network 490 may be used to transfer user modification of the compensation mode settings to the service provider.

Figure 5:
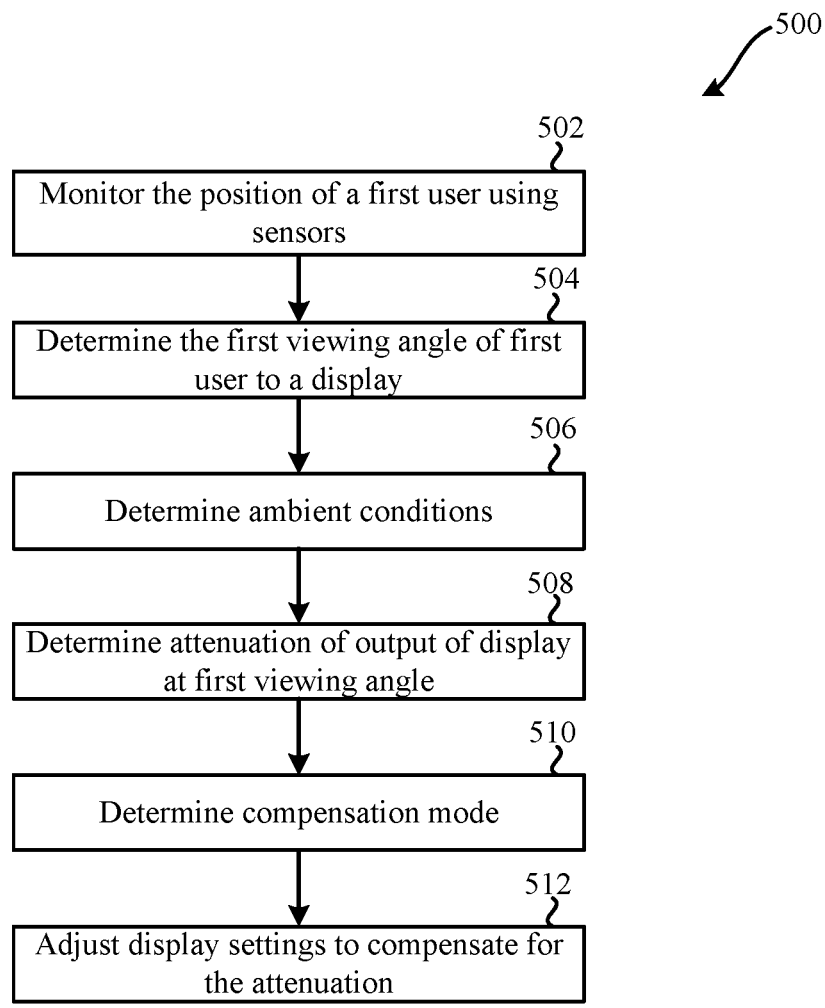
FIG. 5 illustrates an embodiment of a method for determining a compensation mode of a display device.

FIG. 5 illustrates an embodiment of a method 500 for determining a compensation mode of a display device. Method 500 may be performed using the systems previously described. For instance, satellite television distribution system 400 of FIG. 4 or the system 300 of FIG. 3 may be used. Components of such systems may be implemented using hardware, software and/or firmware. Further, the performance of method 500 may include one or more instances of the components of computer system 700 of FIG. 7.

At block 502, the position of a user may be monitored using sensors. Various sensors such as motion sensors, cameras, thermal sensors and the like may be used to determine the location of a user. Based on the location of the user and the location of a display device the viewing angle of the user to the display device may be determined at step 504. In some embodiments sensors may provide other information, in addition to the location of the user. Sensors may be used to determine ambient conditions in at step 506. Ambient conditions may include ambient light conditions, temperature and the like. In some cases ambient light conditions or the temperature may affect the output of the display device. Lower temperature may, for some display devices, reduce the brightness of a backlight. Likewise, bright lights or direct sunlight may also reduce the appearance of brightness of the display device.

At step 508, the expected attenuation of the output signal of the display device at the user's viewing angle may be determined. The expected attenuation may also include the ambient sensor readings. The expected attenuation may be determined from a display data file. A display data file may include expected attenuation data for a particular model or type of display. At step 510, the compensation mode may be determined. The compensation mode may identify which colors, parameters or settings of a display may require adjustment to compensate for the attenuations at the viewing angle. In some cases the compensation mode may take into account the age of the display device. As a display device ages the output of some colors or the brightness of the display may decrease. The age of the display device may be determined automatically by identifying a manufacture date, run hours, serial number or other identifiers from the display device. In some cases the age of the display device may be provided by the user. At step 512, the settings of the display may be adjusted. The settings may be adjusted by sending commands to the display device via one or more control ports on the display device.

Figure 6:
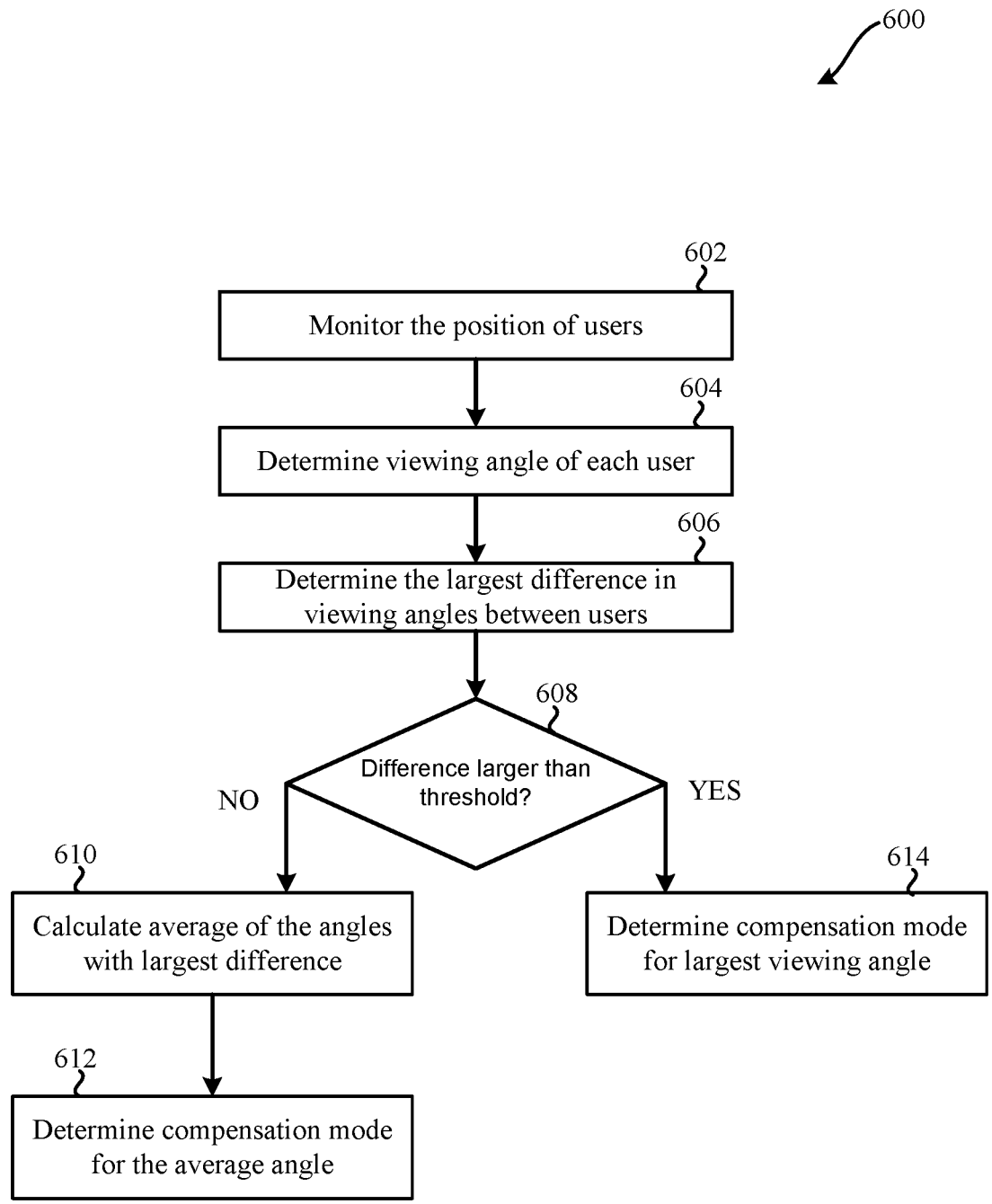
FIG. 6 illustrates an embodiment of a method for determining a compensation mode of a display device with multiple users.

FIG. 6 illustrates an embodiment of a method 600 for determining a compensation mode of a display device with multiple users. Method 600 is optionally performed using the systems previously described. For instance, satellite television distribution system 400 of FIG. 4 or the system 300 of FIG. 3 may be used. Components of such systems may be implemented using hardware, software and/or firmware. Further, the performance of method 600 may include one or more instances of the components of computer system 700 of FIG. 7.

At step 602, sensors are used to monitor the position of users. At step 604, the viewing angle of each user is determined from the sensor data. In some cases the sensor data optionally identifies which users are actively watching the display and filter or ignore the position of the users that may be engaged in other activities. Cameras and other sensors may be used to monitor the activity of users, their eyes and other aspects to gauge their engagement with the display device.

At step 606, the largest difference between the viewing angles of active users is determined. If the difference in the viewing angles is larger than a threshold, such as 20 degrees or 5 degrees or more, the compensation mode is determined for the largest viewing angle at step 614. If the difference in the viewing angles is smaller than the threshold, the average of the viewing angles is calculated, at step 610, and the compensation mode determined for the average angle at step 612.

Figure 7:
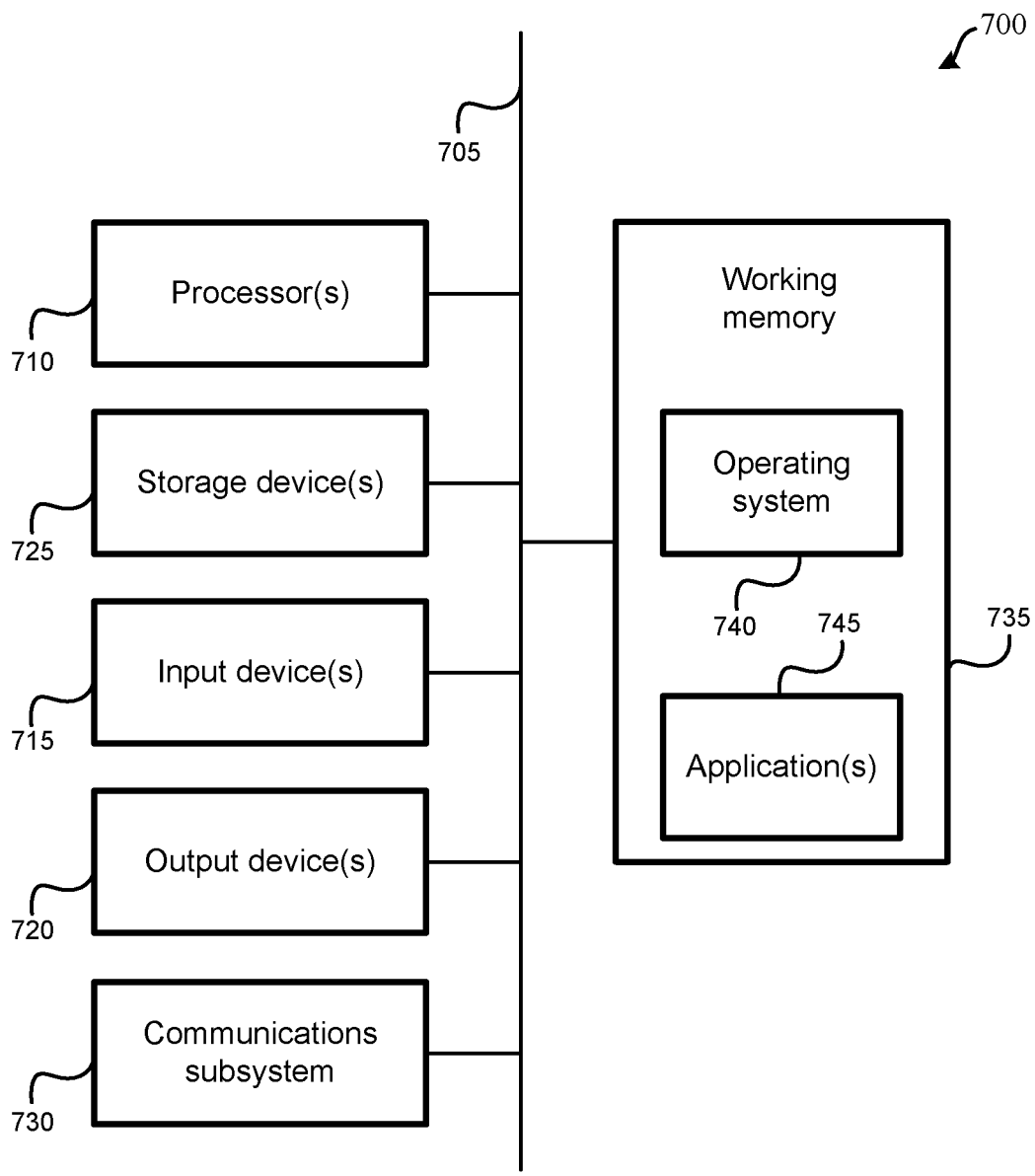
FIG. 7 illustrates an embodiment of a computer system.

A computer system as illustrated in FIG. 7 may be incorporated as part of the previously described devices and systems, such as the described television receivers. FIG. 7 provides a schematic illustration of one embodiment of a computer system 700 that can perform various steps of the methods provided by various embodiments. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication, as appropriate). The hardware elements may include one or more processors 710, including without limitation one or more general-purpose processors and/or one or more special-purpose processors (such as digital signal processing chips, graphics acceleration processors, video decoders and/or the like); one or more input devices 715, which optionally include, without limitation, a mouse, a keyboard, a remote control and/or the like; and one or more output devices 720, which can include, without limitation, a display device, a printer and/or the like.

The computer system 700 may further include (and/or be in communication with) one or more non-transitory storage devices 725, which can comprise, without limitation, local and/or network accessible storage and/or can include, without limitation, a disk drive, a drive array, an optical storage device, a solid-state storage device, such as a random access memory ("RAM") and/or a read-only memory ("ROM"), which can be programmable, flash-updateable and/or the like. Such storage devices may be configured to implement any appropriate data stores, including without limitation, various file systems, database structures and/or the like.

The computer system 700 might also include a communications subsystem 730, which can include without limitation a modem, a network card (wireless or wired), an infrared communication device, a wireless communication device and/or a chipset (such as a Bluetooth™ device, an 802.11 device, a WiFi device, a WiMax device, cellular communication device, etc.) and/or the like. The communications subsystem 730 may permit data to be exchanged with a network (such as the network described below, to name one example), other computer systems and/or any other devices described herein. In many embodiments, the computer system 700 will further comprise a working memory 735, which can include a RAM or ROM device or other storage medium, as described above.

The computer system 700 also can comprise software elements, shown as being currently located within the working memory 735, including an operating system 740, device drivers, executable libraries and/or other code, such as one or more application programs 745, which may comprise computer programs provided by various embodiments and/or may be designed to implement methods and/or configure systems, provided by other embodiments, as described herein. Merely by way of example, one or more procedures described with respect to the method(s) discussed above is optionally implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 725 described above. In some cases, the storage medium might be incorporated within a computer system, such as computer system 700. In other embodiments, the storage medium might be separate from a computer system (e.g., a removable medium, such as a compact disc) and/or provided in an installation package, such that the storage medium can be used to program, configure and/or adapt a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used and/or particular elements might be implemented in hardware, software (including portable software, such as applets, etc.) or both. Further, connection to other computing devices such as network input/output devices may be employed.

As mentioned above, in one aspect, some embodiments may employ a computer system (such as the computer system 700) to perform methods in accordance with various embodiments of the invention. According to a set of embodiments, some or all of the procedures of such methods are performed by the computer system 700 in response to processor 710 executing one or more sequences of one or more instructions (which might be incorporated into the operating system 740 and/or other code, such as an application program 745) contained in the working memory 735. Such instructions may be read into the working memory 735 from another computer-readable medium, such as one or more of the non-transitory storage device(s) 725. Merely by way of example, execution of the sequences of instructions contained in the working memory 735 might cause the processor(s) 710 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 700, various computer-readable media might be involved in providing instructions/code to processor(s) 710 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 725. Volatile media include, without limitation, dynamic memory, such as the working memory 735.

Common forms of physical and/or tangible computer-readable media include, for example, a floppy disk, a flexible disk, hard disk, magnetic tape or any other magnetic medium, a CD-ROM, any other optical medium, any other physical medium with patterns of marks, a RAM, a PROM, EPROM, a FLASH-EPROM, any other memory chip or cartridge or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 730 (and/or components thereof) generally will receive signals and the bus 705 then might carry the signals (and/or the data, instructions, etc. carried by the signals) to the working memory 735, from which the processor(s) 710 retrieves and executes the instructions. The instructions received by the working memory 735 may optionally be stored on a non-transitory storage device 725 either before or after execution by the processor(s) 710.

It should further be understood that the components of computer system 700 can be distributed across a network. For example, some processing may be performed in one location using a first processor while other processing may be performed by another processor remote from the first processor. Other components of computer system 700 may be similarly distributed. As such, computer system 700 may be interpreted as a distributed computing system that performs processing in multiple locations. In some instances, computer system 700 may be interpreted as a single computing device, such as a distinct laptop, desktop computer or the like, depending on the context.

The methods, systems and devices discussed above are examples. Various configurations may omit, substitute or add various procedures or components as appropriate. For instance, in alternative configurations, the methods may be performed in an order different from that described and/or various stages may be added, omitted and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures and techniques have been shown without unnecessary detail in order to avoid obscuring the configurations. This description provides example configurations only and does not limit the scope, applicability or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages or any combination thereof. When implemented in software, firmware, middleware or microcode, the program code or code segments to perform the necessary tasks may be stored in a non-transitory computer-readable medium such as a storage medium. Processors may perform the described tasks.

Having described several example configurations, various modifications, alternative constructions and equivalents may be used without departing from the spirit of the disclosure. For example, the above elements may be components of a larger system, wherein other rules may take precedence over or otherwise modify the application of the invention. Also, a number of steps may be undertaken before, during or after the above elements are considered.

What is claimed is:

1. A method for correction of images displayed by a display device, the method comprising:
   detecting, using a signal from one or more sensors for observing an environment proximate to the display device, a set of users in a set of positions relative to the display device;
   computing an effective viewing angle between the display device and the set of users in accordance with the set of positions relative to the display device;
   detecting, according to the one or more sensors, an ambient condition of the environment proximate to the display device; and
   adjusting image display settings, responsive to detecting the set of users and responsive to detecting the ambient condition, to modify an output image displayed by the display device to compensate for attenuation of output of the display device when viewed in the ambient condition of the environment proximate to the display device from the effective viewing angle, wherein the adjusting is in accordance with expected attenuation data for the display device determined using a data file associated with the display device.

2. The method of claim 1, wherein adjusting the image display settings further to modify the output image displayed by the display device to compensate for distortions of the output of the display device when viewed in the ambient condition of the environment proximate to the display device from the effective viewing angle.

3. The method of claim 1, further comprising:
   determining whether the effective viewing angle is outside a preferred viewing cone of the display,
   wherein the adjusting is performed only when the effective viewing angle is outside the preferred viewing cone of the display.

4. The method of claim 1, further comprising:
   determining into which zone of a plurality of zones the effective viewing angle falls,
   wherein a first zone is associated with viewing angles within a preferred viewing cone of the display defined by a first angle, a second zone is associated with viewing angles greater than the first angle and less than a second angle, and a third zone is associated with viewing angles greater than the second angle and less than a third angle, and
   wherein the adjusting is performed according to one of a plurality of compensation modes, such that the adjusting is not performed when the effective viewing angle is in the first zone, the adjusting is performed according to a first of the plurality of compensation modes when the effective viewing angle is in the second zone, and the adjusting is performed according to a second of the plurality of compensation modes when the effective viewing angle is in the third zone.

5. The method of claim 1, wherein detecting the set of users comprises detecting a single user, such that the set of positions comprises a single position.

6. The method of claim 1, wherein:
   detecting the set of users in a set of positions relative to the display device comprises detecting a plurality of users, each user in an associated position of a plurality of positions relative to the display device; and computing the effective viewing angle comprises:
- computing a first viewing angle between a first of the plurality of users and the display device in accordance with a first associated position of the plurality of positions;
- computing a second viewing angle between a second of the plurality of users and the display device in accordance with a second associated position of the plurality of positions;
- determining that a difference between the first viewing angle and the second viewing angle is less than a threshold angle; and
- determining the effective viewing angle as a third viewing angle between the first viewing angle and the second viewing angle.

7. The method of claim 6, wherein:
the first viewing angle is associated with a first compensation mode of a plurality of compensation modes;
the second viewing angle is associated with a second compensation mode of the plurality of compensation modes; and
determining the effective viewing angle as the third viewing angle between the first viewing angle and the second viewing angle comprises determining the third viewing angle as associated with an average of the first compensation mode and the second compensation mode.

8. The method of claim 1, wherein the one or more sensors comprises an acoustic camera or 3D imager to determine locations and/or motions of the set of users relative to the display device.

9. The method of claim 1, wherein adjusting the image display settings comprises adjusting one or more of a brightness setting, a color setting, or a contrast setting.

10. The method of claim 1, wherein adjusting image display settings comprises transforming input images provided to the display device by applying one or more of a brightness transformation, a color transformation, or a contrast transformation.

11. A television receiver for correction of images displayed by a display device, the television receiver comprising:
one or more processors;
one or more sensors for observing an environment proximate to the display device, wherein the one or more sensors are communicatively coupled with the one or more processors; and
a non-transitory memory communicatively coupled with and readable by the one or more processors and having stored therein processor-readable instructions that, when executed by the one or more processors, cause the one or more processors to perform operations including:
- detecting, using a signal from the one or more sensors, a set of users in a set of positions relative to the display device;
- computing an effective viewing angle between the display device and the set of users in accordance with the set of positions relative to the display device;
- detecting, according to the one or more sensors, an ambient condition of the environment proximate to the display device; and
- adjusting image display settings, responsive to detecting the set of users and responsive to detecting the ambient condition, to modify an output image displayed by the display device to compensate for attenuation of output of the display device when viewed in the ambient condition of the environment proximate to the display device from the effective viewing angle, wherein the adjusting is in accordance with expected attenuation data for the display device determined using a data file associated with the display device.

12. The television receiver of claim 11, wherein adjusting the image display settings further to modify the output image displayed by the display device to compensate for distortions of the output of the display device when viewed in the ambient condition of the environment proximate to the display device from the effective viewing angle.

13. The television receiver of claim 11, the operations further comprise:
determining whether the effective viewing angle is outside a preferred viewing cone of the display,
wherein the adjusting is performed only when the effective viewing angle is outside the preferred viewing cone of the display.

14. The television receiver of claim 11, the operations further comprise:
determining into which zone of a plurality of zones the effective viewing angle falls,
wherein a first zone is associated with viewing angles within a preferred viewing cone of the display defined by a first angle, a second zone is associated with viewing angles greater than the first angle and less than a second angle, and a third zone is associated with viewing angles greater than the second angle and less than a third angle, and
wherein the adjusting is performed according to one of a plurality of compensation modes, such that the adjusting is not performed when the effective viewing angle is in the first zone, the adjusting is performed according to a first of the plurality of compensation modes when the effective viewing angle is in the second zone, and the adjusting is performed according to a second of the plurality of compensation modes when the effective viewing angle is in the third zone.

15. The television receiver of claim 11, wherein detecting the set of users comprises detecting a single user, such that the set of positions comprises a single position.

16. The television receiver of claim 11, wherein:
detecting the set of users in a set of positions relative to the display device comprises detecting a plurality of users, each user in an associated position of a plurality of positions relative to the display device; and
computing the effective viewing angle comprises:
- computing a first viewing angle between a first of the plurality of users and the display device in accordance with a first associated position of the plurality of positions;
- computing a second viewing angle between a second of the plurality of users and the display device in accordance with a second associated position of the plurality of positions;
- determining that a difference between the first viewing angle and the second viewing angle is less than a threshold angle; and
- determining the effective viewing angle as a third viewing angle between the first viewing angle and the second viewing angle.

17. The television receiver of claim 16, wherein:
the first viewing angle is associated with a first compensation mode of a plurality of compensation modes;
the second viewing angle is associated with a second compensation mode of the plurality of compensation modes; and
determining the effective viewing angle as the third viewing angle between the first viewing angle and the second viewing angle comprises determining the third viewing angle as associated with an average of the first compensation mode and the second compensation mode.

18. The television receiver of claim 11, wherein the one or more sensors comprises an acoustic camera or 3D imager to determine locations and/or motions of the set of users relative to the display device.

19. The television receiver of claim 11, wherein adjusting the image display settings comprises adjusting one or more of a brightness setting, a color setting, or a contrast setting.

20. The television receiver of claim 11, wherein adjusting image display settings comprises transforming input images provided to the display device by applying one or more of a brightness transformation, a color transformation, or a contrast transformation.

\* \* \* \* \*